US012155985B2

(12) United States Patent
Cochran et al.

(10) Patent No.: US 12,155,985 B2
(45) **Date of Patent: *Nov. 26, 2024**

(54) HEADSET WITH INTERNAL GIMBAL

(71) Applicant: Voyetra Turtle Beach, Inc., White Plains, NY (US)

(72) Inventors: Scot Cochran, San Diego, CA (US); Tim Wiley, San Diego, CA (US); Andy Logan, Newbury Park, CA (US)

(73) Assignee: Voyetra Turtle Beach, Inc., White Plains, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/311,345

(22) Filed: May 3, 2023

(65) Prior Publication Data

US 2023/0276158 A1 Aug. 31, 2023

Related U.S. Application Data

(63) Continuation of application No. 17/539,666, filed on Dec. 1, 2021, now Pat. No. 11,683,627, which is a (Continued)

(51) Int. Cl.
*H04R 1/10* (2006.01)
*H04R 5/033* (2006.01)

(52) U.S. Cl.
CPC ......... *H04R 1/1008* (2013.01); *H04R 1/1066* (2013.01); *H04R 1/105* (2013.01); (Continued)

(58) Field of Classification Search
CPC .... H04R 1/1008; H04R 1/1066; H04R 1/105; H04R 1/1058; H04R 5/0335; H04R 2201/103; H04R 2205/022; H04R 2420/07
See application file for complete search history.

(56) References Cited

U.S. PATENT DOCUMENTS 3,505,684 A * 4/1970 Hutchinson ............. A61F 11/14 2/209
3,719,954 A * 3/1973 Beguin ................... A61F 11/14 2/209
(Continued)

FOREIGN PATENT DOCUMENTS

AT 322651 B 6/1975
DE 2540839 A1 4/1976
(Continued)

OTHER PUBLICATIONS

European Office Action, Appln No. 16179833.5 dated Mar. 9, 2018.
European Office Communication with extended European search report Appln No. 16179833.5 dated Nov. 17, 2016.

*Primary Examiner* — Oyesola C Ojo
(74) *Attorney, Agent, or Firm* — McAndrews, Held & Malloy, Ltd.

(57) ABSTRACT

A method and system for a headset with internal gimbal, where the headset comprises a headband, a headband, and ear cups coupled to the headband, wherein each ear cup may be coupled to the headband utilizing an internal gimbal. The internal gimbal may comprise a tip that is wider than its base. The tip may be rounded. The headband may comprise headband endcaps at each end of the headband. A headband slide may be coupled to each headband endcap. The headband ear cups may be coupled to the headband via the headband slides. Each headband slide may be coupled to a headband endcap via a headband pivot. The headband pivot may provide rotational motion of the ear cups with respect to the headband. The force on ears of a user of the headset may be spread evenly by the internal gimbals.

20 Claims, 6 Drawing Sheets

Related U.S. Application Data continuation of application No. 15/931,287, filed on May 13, 2020, now Pat. No. 11,218,790, which is a continuation of application No. 14/801,655, filed on Jul. 16, 2015, now Pat. No. 10,667,029.

(52) U.S. Cl.
CPC .......... *H04R 1/1058* (2013.01); *H04R 5/0335* (2013.01); *H04R 2201/103* (2013.01); *H04R 2205/022* (2013.01); *H04R 2420/07* (2013.01)

(56) References Cited

U.S. PATENT DOCUMENTS

| | | | | |
|---|---|---|---|---|
| 5,109,424 | A * | 4/1992 | Andre | H04R 1/1008 381/384 |
| 5,369,857 | A * | 12/1994 | Sacherman | H04R 5/0335 379/430 |
| 5,469,505 | A | 11/1995 | Gattey et al. | |
| 6,611,963 | B2 * | 9/2003 | Woo | H04R 5/0335 2/209 |
| 6,678,897 | B2 * | 1/2004 | Lindgren | A61F 11/14 181/129 |
| 7,072,483 | B2 * | 7/2006 | Lenhard-Backhaus | H04R 1/1066 381/370 |
| 8,213,667 | B2 * | 7/2012 | Nelson | H04R 1/1066 381/370 |
| 8,503,710 | B1 * | 8/2013 | Meyberg | H04R 1/1066 381/370 |
| 8,732,864 | B2 * | 5/2014 | Fountain | A61F 11/14 2/209 |
| 8,755,554 | B2 * | 6/2014 | Kuhtz | H04R 1/1033 381/372 |
| 10,667,029 | B2 | 5/2020 | Cochran et al. | |
| 11,218,790 | B2 * | 1/2022 | Cochran | H04R 1/1066 |
| 2003/0210801 | A1 * | 11/2003 | Naksen | H04R 1/1066 381/376 |
| 2004/0154082 | A1 * | 8/2004 | Saffran | A61F 11/14 2/423 |
| 2004/0213428 | A1 * | 10/2004 | Lenhard-Backhaus | H04R 1/1066 381/370 |
| 2011/0051976 | A1 * | 3/2011 | Tsai | H04R 1/1066 381/378 |
| 2011/0206216 | A1 * | 8/2011 | Brunner | H04R 1/1066 381/74 |
| 2012/0140973 | A1 * | 6/2012 | Olodort | H04R 1/1066 381/375 |
| 2012/0269374 | A1 * | 10/2012 | Lee | H04R 1/1008 381/379 |
| 2015/0195640 | A1 * | 7/2015 | Essabar | H04R 1/1058 381/378 |
| 2016/0127819 | A1 * | 5/2016 | Shiomi | H04R 1/1033 381/378 |
| 2016/0134962 | A1 * | 5/2016 | Gray | H04R 1/1058 381/371 |
| 2016/0324248 | A1 * | 11/2016 | Winters | A42B 3/04 |
| 2019/0208309 | A1 * | 7/2019 | Clark | H04R 1/1008 |
| 2022/0321990 | A1 * | 10/2022 | Clark | H04R 1/1083 |

FOREIGN PATENT DOCUMENTS

| | | | |
|---|---|---|---|
| EP | 1622419 | A1 | 2/2006 |
| WO | 2012094176 | A2 | 7/2012 |

* cited by examiner

HEADSET WITH INTERNAL GIMBAL

CLAIM OF PRIORITY

This application is a continuation of U.S. patent application Ser. No. 17/539,666, filed Dec. 1, 2021, which is a continuation of U.S. patent application Ser. No. 15/931,287, filed May 13, 2020, now U.S. Pat. No. 11,218,790, which is a continuation of U.S. patent application Ser. No. 14/801,655 filed on Jul. 16, 2015, now U.S. Pat. No. 10,667,029. Each of the aforementioned documents is hereby incorporated by reference in its entirety.

INCORPORATION BY REFERENCE

N/A

TECHNICAL FIELD

Aspects of the present application relate to audio headsets, and more specifically, to methods and systems for a headset with internal gimbal.

BACKGROUND

Limitations and disadvantages of conventional approaches to adjustable headsets will become apparent to one of skill in the art, through comparison of such approaches with some aspects of the present method and system set forth in the remainder of this disclosure with reference to the drawings.

BRIEF SUMMARY

Methods and systems are provided for a headset with internal gimbal, substantially as illustrated by and/or described in connection with at least one of the figures, as set forth more completely in the claims.

DETAILED DESCRIPTION

Certain aspects of the disclosure may be found in a headset with internal gimbal. Example aspects of the disclosure may include, in a headset comprising a headband and ear cups coupled to the headband, where each ear cup is coupled to the headband utilizing an internal gimbal, spreading the force of the ear cups around the ears of a user's head utilizing the internal gimbals. The internal gimbal may comprise a gimbal post in an aperture. The gimbal post may comprise a tip that is wider than its base. The tip may be rounded. The headband may comprise headband endcaps at each end of the headband. A headband slide may be coupled to each headband endcap. The headband ear cups may be coupled to the headband via the headband slides. Each headband slide may be coupled to a headband endcap via a headband pivot. The headband pivot may provide rotational motion of the ear cups with respect to the headband.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations.

Figure 1:
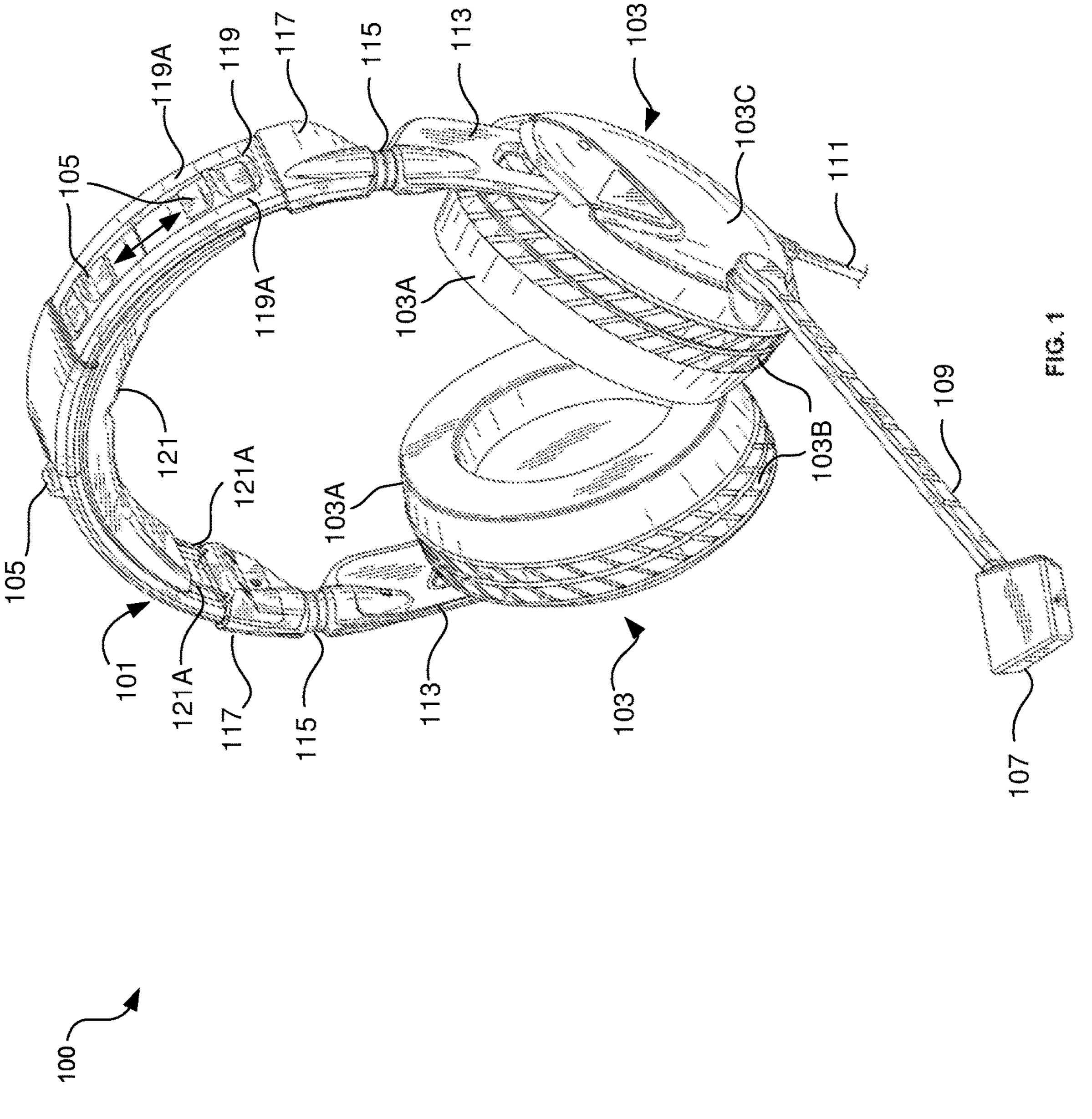
FIG. 1 depicts an oblique view of an example headset, in accordance with an embodiment of the disclosure.

FIG. 1 depicts an oblique view of an example headset, in accordance with an embodiment of the disclosure. Referring to FIG. 1, there is shown a headset 100 with headband 101 and ear cups 103. There are also shown a microphone 107, a microphone boom arm 109, a line-in cable 111, headband slides 113, headband pivots 115, headband endcaps 117, an upper headband 119, and a floating headband 121. The headset 100 may be utilized for gaming, phone, or audio playback purposes, for example. In an example scenario, the headset 100 comprises a powered headset. In another example scenario, the headset 100 comprises a passive headset.

The headband pivots 115 couple the headband slides 113 to the headband endcaps 117, and provide rotational control for the ear cups 103. The microphone 107 provides electrical signals proportional to sound waves detected and may comprise a directional microphone for picking up audio signals from the user while sensing reduced background noise or sound from other sources, for example. The boom arm 109 provides a rigid support for the microphone 107, enabling an optimal position in front of the user for sensing sound from the user.

The upper headband 119 may be coupled to the headband endcaps 117, and slider knobs 105 may be incorporated in the upper headband 119 for adjusting the rigidity of the upper headband 119. In an example scenario, in the region where the slider knobs 105 are integrated, the upper headband comprises two strips 119A of a support structure, e.g., metal or rigid plastic, between which the slider knobs 105 may be actuated. The two slider knobs 105 shown between the strips 119A on the right side of the upper headband 119 merely indicate the full range that the slider knobs 105 may travel. The slider knobs 105 may be coupled to a metal or rigid plastic strip above the slider knobs 105 in the upper headband 119. By sliding the slider knobs 105 downward towards the headband endcaps 117, the rigid strip may increase the rigidity of the upper headband 119, thereby increasing force of the ear cups 103 against the ears of the user.

The ear cups 103 may be coupled to the headband 101 via headband slides 113 and to headband endcaps 117 via headband pivots 115. The headband slides may comprise metal or rigid plastic and may comprise a fork structure, where the two tines extend into the ear cups 103 and may have hemispherical ball features thereon that may be slid into detent features in the ear cup 103, thereby providing discrete headset size settings that are held in place utilizing a ball detent structure. This vertical adjustment of the headband slides 113 may comprise a major adjustment of the headset 100. The major adjustment changes the size of the headset 100 as well as the force on the ear.

The force on the ear is adjusted due to the shape and rigidity of the headband 101 and associated parts, such as the headband slides 113. Extending the length of the arms of the headset by pulling the headband slides out of the ear cups 103 may increase the force on the user's ears, as this decreases the distance between the ear cups 103 when not placed on a head, so that more force is needed to expand the headset 100 over the user's head. In contrast, the force on the ear may be decreased by reducing the length of the arms of the headset by pushing the headband slides 113 into the ear cups 103.

Minor adjustment of the headset 100 is enabled by the floating headband 121, which may comprise a flexible band with wire segments 121A that extend from the headband endcaps 117 into the floating headband 121 and back down to the headband endcaps 117. The flexibility in the floating headband 121 therefore provides a minor adjustment of the headset 100.

The ear cups 103 may each comprise an ear pad 103A, a gimbal gasket 103B, and an outer shell 103C. The ear pads 103A may comprise pads that provide cushion for the user's ears and also provide adequate seal for the ears to exclude ambient noise. The gimbal gasket 103B may comprise a silicon dust cover, for example, that provides a volume between the ear pad 103A and outer shell 103C, to allow the ear cup 103 to pivot about a gimbal within the ear cup 103.

Figure 4:
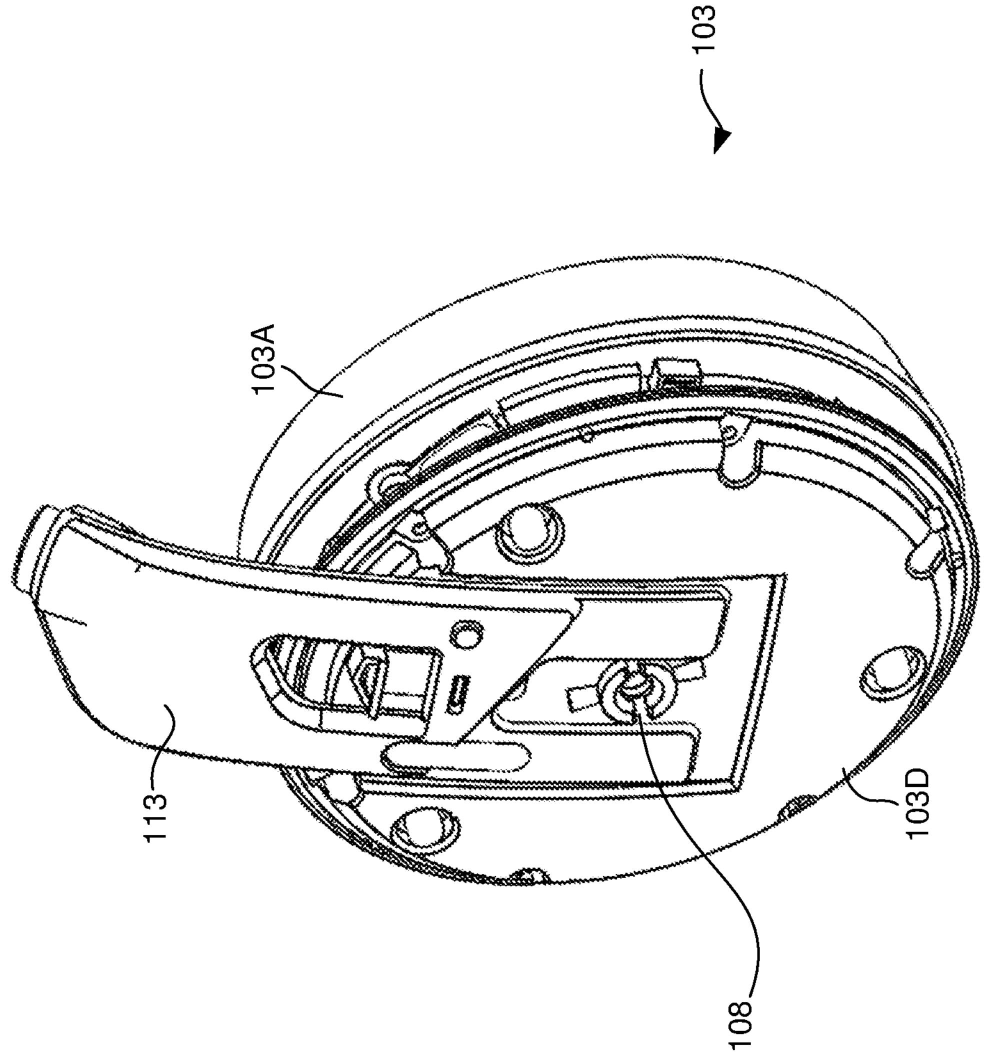
FIG. 4 illustrates a cut-away view of a headset ear cup with an internal gimbal, in accordance with an example embodiment of the disclosure.
Figure 5:
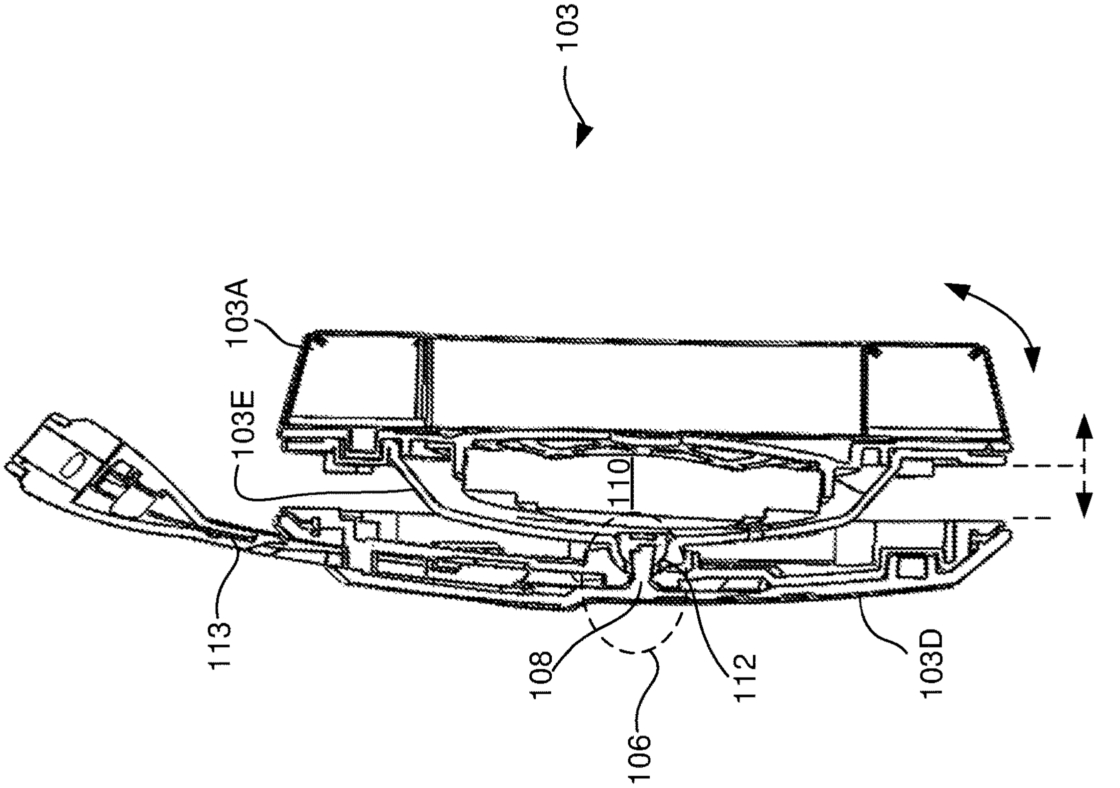
FIG. 5 illustrates a side view of the headband ear cup with an internal gimbal, in accordance with an example embodiment of the disclosure.

The outer shell 103C may comprise an internal gimbal, shown further with respect to FIGS. 4 and 5, for example, that allows the ear cups 103 to pivot about the gimbal. This pivoting provides flexibility in the position of the ear cups 103 with respect to different shapes and sizes of the head of the user.

Figure 2:
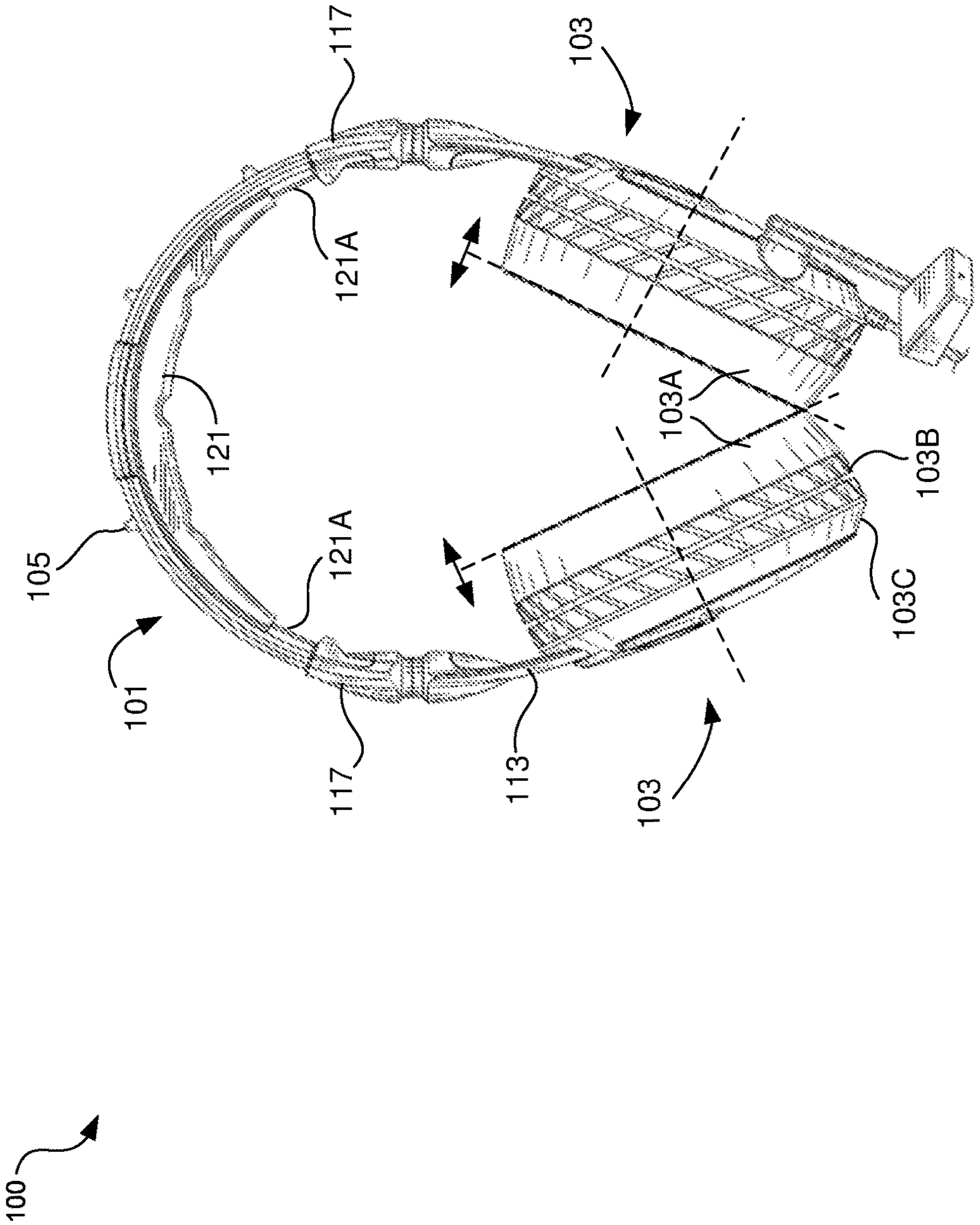
FIG. 2 illustrates a front view of a headset with an internal gimbal, in accordance with an example embodiment of the disclosure.

FIG. 2 illustrates a front view of a headset with an internal gimbal, in accordance with an example embodiment of the disclosure. Referring to FIG. 2, there is shown the headset 100 with elements as described with respect to FIG. 1, for example.

Figure 3:
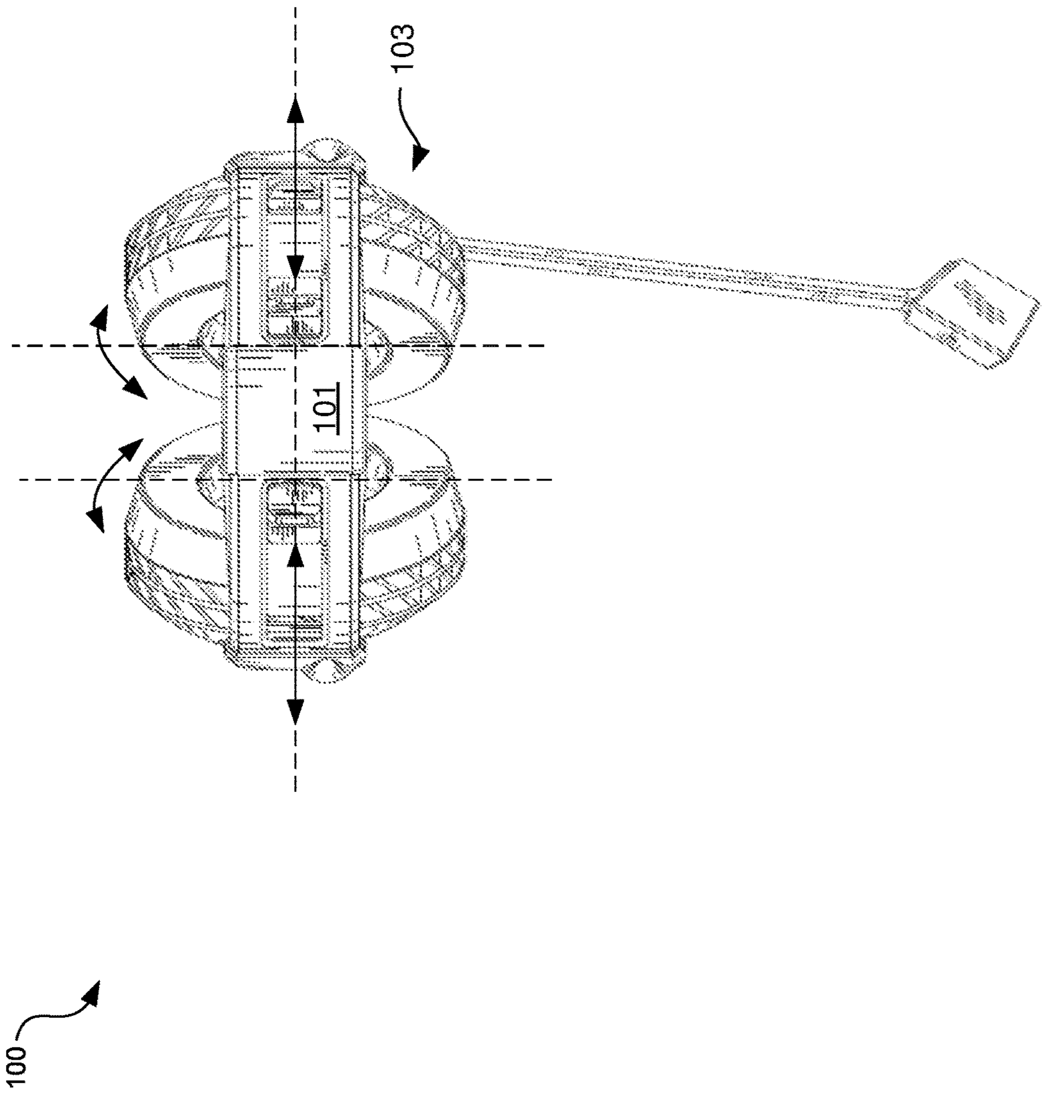
FIG. 3 is a top view of a headset with an internal gimbal, in accordance with an example embodiment of the disclosure.

The arrows adjacent to the ear cups 103 illustrate the pivoting of the ear cups 103 with respect to the headband slides 113. While the arrows indicate movement in one direction, the pivoting may be in any direction about the center axis of the ear cups 103 such that the gimbal gasket 103B may be compressed along any portion of its circumference of the ear cups 103. The pivoting of the ear cups 103 may spread the force on the user's head evenly around the ear, thereby assisting in providing a good seal to exclude ambient noise FIG. 3 is a top view of a headset with an internal gimbal, in accordance with an example embodiment of the disclosure. Referring to FIG. 3, there is shown a side view of the headset 100 with the headband 101 and ear cups 103. As shown by the arrows, the internal gimbal allows the ear cups 103 to be pivoted in multiple directions about the center axis of each ear cup.

FIG. 4 illustrates a cut-away view of a headset ear cup with an internal gimbal, in accordance with an example embodiment of the disclosure. Referring to FIG. 4, there are shown the headband slides 113 and the ear cup 103, where the ear cup 103 is shown without the outer shell 103C and the gimbal gasket 103B such that the internal structure is visible. Therefore, FIG. 4 shows the ear pad 103A, an ear cup frame 103D, and an internal gimbal 106. The ear cup frame 103D comprises a rigid structure that may provide a mechanical support for the connection to the headband via the headband slides 113 and may provide the gimbal post 108 for the internal gimbal.

The gimbal post 108 may comprise a post in the ear cup frame 103D and may be inserted into an aperture in a portion of the ear cup 103 on which the ear pad 103A is affixed. For example, the gimbal post 108 may comprise a rounded or ball shape in the ear cup frame 103D, thereby enabling pivoting of the portion of the ear cup 103 on which the ear pad 103A is affixed, shown further with respect to FIG. 5. In another example scenario, the gimbal post 108 may be formed in the portion of the ear cup 103 on which the ear pad 103A is affixed with an aperture in the ear cup frame 103D.

FIG. 5 illustrates a side view of the headband ear cup with an internal gimbal, in accordance with an example embodiment of the disclosure. Referring to FIG. 5, there are shown the ear cup 103, internal gimbal 106, and headband slide 113. As with FIG. 4, the ear cup 103 is shown without the outer shell 103C and gimbal gasket 103B, so as to show the internal gimbal structure. Accordingly, FIG. 5 shows the ear cup frame 103D, the pad frame 103E, and the speaker driver 110, none of which would be visible if the outer shell 103C and gimbal gasket 1038 were shown. The internal gimbal 106 may comprise a gimbal post 108 and an aperture 112 where the aperture 112 is formed in the pad frame 108E.

The speaker driver 110 comprises a magnetic coil, for example, and associated electronic components for converting an electrical signal to a sound signal. The pad frame 103E comprises a supporting frame for the ear cup 103 that connects to the gimbal post 108 and at least partially encompasses the speaker driver 110. The pad frame 103E extends to the outer edge of the ear cup 103 and comprises support structure upon which the ear pad 103A may be affixed.

In an example scenario, the gimbal post 108 may comprise a center post that is within the opening 112 in the pad frame 103E. The pivot point may be wider at the tip within the pad frame 103E so as to lock the pad frame 103A to the ear cup frame 103D, for example. The gimbal post 108 in the opening 112 may enable full pivoting action for the ear pad 103A with respect to the ear cup frame 103D where the distance between the ear pad 103A and the ear cup frame 103D, shown by the dashed lines in FIG. 5, may vary depending on the positioning of the headset on the user's head.

The gimbal post 108 and opening 112 provide a pivoting motion for the ear cups 103 such that a force on the head of the headset user may be spread evenly around their ears and provide a comfortable and proper seal for exclusion of ambient noise. The pivoting may be about an axis defined by the gimbal post 108.

Figure 6:
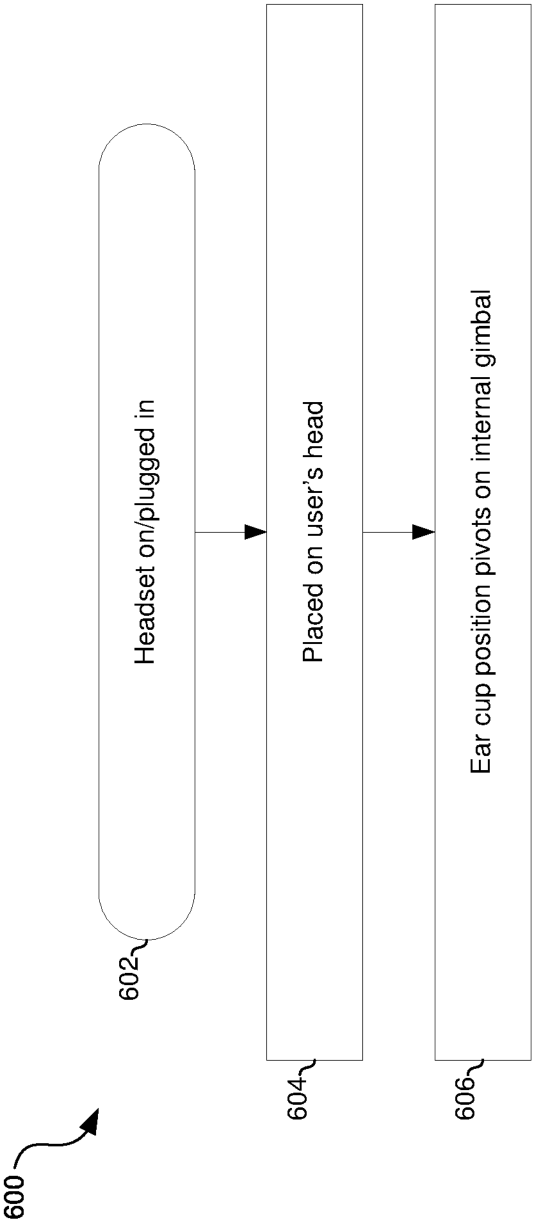
FIG. 6 is a flowchart illustrating an example process for a headset with an internal gimbal.

FIG. 6 is a flowchart illustrating an example process for a headset with an internal gimbal. Referring to FIG. 6, there is shown a flow chart 600, comprising a plurality of example steps. In step 602, the headset 100 may be powered up for gaming, phone, or music playback purposes where the headset is a powered headset, or may be plugged into a signal source if the headset is a passive headset. In step 604, the headset may be placed on a user's head and in step 606, the position of the ear cups may pivot about the internal gimbal to provide desired fit to the user's head.

In an example embodiment of the disclosure a headset with internal gimbal is disclosed where the headset may comprise a headband, a headband, and ear cups coupled to the headband, where each ear cup may be coupled to the headband utilizing an internal gimbal, which may comprise a gimbal post in an aperture. The gimbal post may comprise a tip that is wider than its base. The tip may be rounded.

The headband may comprise headband endcaps at each end of the headband. A headband slide may be coupled to each headband endcap. The headband ear cups may be coupled to the headband via the headband slides. Each headband slide may be coupled to a headband endcap via a headband pivot. The headband pivot may provide rotational motion of the ear cups with respect to the headband. The force on ears of a user of the headset may be spread evenly by the internal gimbals.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A system, the system comprising:

an ear cup comprising a cup frame and an internal gimbal; and a headband comprising a headband slide, wherein:

the cup frame is coupled to the headband slide via a tine on each side of the internal gimbal, the tines, on each side of the internal gimbal, are unconnected on an end closest to the headband slide, and the headband slide is adjustable in a vertical direction, with respect to the internal gimbal of the ear cup.

2. The system of claim 1, wherein the internal gimbal extends into an aperture in a pad frame in the ear cup.

3. The system of claim 1, wherein the internal gimbal comprises a tip that is wider than its base.

4. The system of claim 3, wherein the tip is rounded.

5. The system of claim 1, wherein the headband comprises headband endcaps at each end of the headband.

6. The system of claim 5, wherein a headband slide is coupled to each headband endcap.

7. The system of claim 6, wherein the ear cup is coupled to the headband via the headband slides with a ball detent structure.

8. The system of claim 6, wherein each headband slide is coupled to a headband endcap via a headband pivot.

9. The system of claim 8, wherein the headband pivot provides rotational motion of the ear cup with respect to the headband.

10. The system of claim 1, wherein the force on ears of a user of the headset is spread evenly by the internal gimbals.

11. A method, the method comprising:

spreading a force of an ear cup, via an internal gimbal, around a headset user's ear, wherein:

the ear cup comprises a cup frame and the internal gimbal, a headband comprises a headband slide, the cup frame is coupled to the headband slide via a tine on each side of the internal gimbal, the tines, on each side of the internal gimbal, are unconnected on an end closest to the headband slide, and the headband slide is adjustable in a vertical direction, with respect to the internal gimbal of the ear cup.

12. The method of claim 11, wherein the internal gimbal extends into an aperture in a pad frame in the ear cup.

13. The method of claim 11, wherein the internal gimbal comprises a tip that is wider than its base.

14. The method of claim 13, wherein the tip is rounded.

15. The method of claim 11, wherein the headband comprises headband endcaps at each end of the headband.

16. The method of claim 15, wherein a headband slide is coupled to each headband endcap.

17. The method of claim 16, wherein the ear cup is coupled to the headband via the headband slides with a ball detent structure.

18. The method of claim 16, wherein each headband slide is coupled to a headband endcap via a headband pivot.

19. The method of claim 18, wherein the headband pivot provides rotational motion of the ear cup with respect to the headband.

20. An audio headset, the headset comprising:

a headband; and two ear cups coupled to the headband, wherein:

each ear cup comprises a respective cup frame and a respective internal gimbal, the headband comprises a headband slide, each cup frame is coupled to the headband slide via a tine on each side of the respective internal gimbal, the tines, on each side of the internal gimbal, are unconnected on an end closest to the headband slide, and the headband slide is adjustable in a vertical direction, with respect to the internal gimbal of each ear cup.

* * * * *